United States Patent
Chen et al.

(10) Patent No.: US 12,204,398 B2
(45) Date of Patent: Jan. 21, 2025

(54) INCREMENTAL CAUSAL DISCOVERY AND ROOT CAUSE LOCALIZATION FOR ONLINE SYSTEM FAULT DIAGNOSIS

(71) Applicant: NEC Laboratories America, Inc., Princeton, NJ (US)

(72) Inventors: Zhengzhang Chen, Princeton Junction, NJ (US); Haifeng Chen, West Windsor, NJ (US); Liang Tong, Lawrenceville, NJ (US); Dongjie Wang, Orlando, FL (US)

(73) Assignee: NEC Corporation, Tokyo (JP)

( * ) Notice: Subject to any disclaimer, the term of this patent is extended or adjusted under 35 U.S.C. 154(b) by 4 days.

(21) Appl. No.: 18/359,309

(22) Filed: Jul. 26, 2023

(65) Prior Publication Data
US 2024/0061739 A1    Feb. 22, 2024

Related U.S. Application Data

(60) Provisional application No. 63/442,155, filed on Jan. 31, 2023, provisional application No. 63/397,955, filed on Aug. 15, 2022.

(51) Int. Cl.
*G06F 11/07* (2006.01)
*G06F 11/34* (2006.01)

(52) U.S. Cl.
CPC ........ *G06F 11/079* (2013.01); *G06F 11/0709* (2013.01); *G06F 11/076* (2013.01); *G06F 11/3447* (2013.01)

(58) Field of Classification Search
CPC .. G06F 11/079; G06F 11/0709; G06F 11/076; G06F 11/3447
See application file for complete search history.

(56) References Cited

U.S. PATENT DOCUMENTS

| | | | | |
|---|---|---|---|---|
| 2006/0242288 A1* | 10/2006 | Masurkar | ............ | G06F 11/0748 345/468 |
| 2015/0280968 A1* | 10/2015 | Gates | .................. | G06F 11/0769 714/37 |

(Continued)

FOREIGN PATENT DOCUMENTS

| | | | | |
|---|---|---|---|---|
| WO | WO-2017087440 A1 * | 5/2017 | .......... | G06F 11/0709 |
| WO | WO-2019221461 A1 * | 11/2019 | ............... | G06N 3/02 |

OTHER PUBLICATIONS

Wang et al., "Disentangled Causal Graph Learning for Online Unsupervised Root Cause Analysis", arXiv:2305.10638 [cs.LG]; pp. 1-11, Jun. 2, 2023 (Year: 2023).*

(Continued)

*Primary Examiner* — Matthew M Kim
*Assistant Examiner* — Indranil Chowdhury
(74) *Attorney, Agent, or Firm* — Joseph Kolodka

(57) ABSTRACT

A computer-implemented method for identifying root cause failure and fault events is provided. The method includes detecting a trigger point, converting, via an encoder, previous system state data, new batch data in a next system state, and a causal graph to system state-invariant embeddings and system state-dependent embeddings, generating a learned causal graph, via a graph generation layer, by integrating state-invariant and state-dependent information, and predicting, by a prediction layer, future time-series data on the learned causal graph.

20 Claims, 11 Drawing Sheets

(56) References Cited

U.S. PATENT DOCUMENTS

| | | | |
|---|---|---|---|
| 2018/0173599 A1* | 6/2018 | Kalech | G06F 11/2273 |
| 2019/0227860 A1* | 7/2019 | Gefen | G06F 16/9024 |
| 2020/0287923 A1* | 9/2020 | Raghavendra | G06N 5/022 |
| 2021/0165704 A1* | 6/2021 | Savir | G06F 11/079 |
| 2022/0035694 A1* | 2/2022 | Yu | G06F 11/3075 |
| 2022/0382614 A1 | 12/2022 | Chen et al. | |
| 2023/0040564 A1* | 2/2023 | Wang | G06F 18/29 |
| 2023/0069074 A1 | 3/2023 | Chen et al. | |
| 2023/0325269 A1* | 10/2023 | Gusat | G06F 11/0709 |
| | | | 714/2 |
| 2024/0054043 A1* | 2/2024 | Chen | G06F 11/0709 |

OTHER PUBLICATIONS

Dong, B., Chen, Z., Tang, L. A., Chen, H., Wang, H., Zhang, K., . . . & Li, Z. (Nov. 27, 2020). Anomalous event sequence detection. IEEE Intelligent Systems, 36(3), 5-13.

Brandón, Á., Solé, M., Huélamo, A., Solans, D., Pérez, M. S., & Muntés-Mulero, V. (Oct. 7, 2019). Graph-based root cause analysis for service-oriented and microservice architectures. Journal of Systems and Software, 159, 110432.

Wang, D., Chen, Z., Ni, J., Tong, L., Wang, Z., Fu, Y., & Chen, H. (Feb. 3, 2023). Hierarchical graph neural networks for causal discovery and root cause localization. arXiv preprint arXiv:2302.01987.

Cheng, W., Zhang, K., Chen, H., Jiang, G., Chen, Z., & Wang, W. (Aug. 13, 2016). Ranking causal anomalies via temporal and dynamical analysis on vanishing correlations. In Proceedings of the 22nd ACM SIGKDD International Conference on Knowledge Discovery and Data Mining (pp. 805-814).

Solé, M., Muntés-Mulero, V., Rana, A. I., & Estrada, G. (Jul. 3, 2017). Survey on models and techniques for root-cause analysis. arXiv preprint arXiv:1701.08546.

* cited by examiner

US 12,204,398 B2

INCREMENTAL CAUSAL DISCOVERY AND ROOT CAUSE LOCALIZATION FOR ONLINE SYSTEM FAULT DIAGNOSIS

RELATED APPLICATION INFORMATION

This application claims priority to Provisional Application No. 63/397,955 filed on Aug. 15, 2022, and Provisional Application No. 63/442,155 filed on Jan. 31, 2023, the contents of both of which are incorporated herein by reference in their entirety.

BACKGROUND

Technical Field

The present invention relates to root cause analysis, and, more particularly, to incremental causal graph learning for online root cause analysis.

Description of the Related Art

Root Cause Analysis (RCA) aims to identify the underlying causes of system faults (e.g., anomalies, malfunctions, errors, failures) based on system monitoring data. RCA has been widely used in IT operations, telecommunications, industrial process control, etc., because a fault in these systems can greatly lower user experiences and cause losses.

SUMMARY

A method for identifying root cause failure and fault events is presented. The method includes detecting a trigger point, converting, via an encoder, previous system state data, new batch data in a next system state, and a causal graph to system state-invariant embeddings and system state-dependent embeddings, generating a learned causal graph, via a graph generation layer, by integrating state-invariant and state-dependent information, and predicting, by a prediction layer, future time-series data on the learned causal graph.

A non-transitory computer-readable storage medium comprising a computer-readable program for identifying root cause failure and fault events is presented. The computer-readable program when executed on a computer causes the computer to perform the steps of detecting a trigger point, converting, via an encoder, previous system state data, new batch data in a next system state, and a causal graph to system state-invariant embeddings and system state-dependent embeddings, generating a learned causal graph, via a graph generation layer, by integrating state-invariant and state-dependent information, and predicting, by a prediction layer, future time-series data on the learned causal graph.

A system for identifying root cause failure and fault events is presented. The system includes a processor and a memory that stores a computer program, which, when executed by the processor, causes the processor to detect a trigger point, convert, via an encoder, previous system state data, new batch data in a next system state, and a causal graph to system state-invariant embeddings and system state-dependent embeddings, generate a learned causal graph, via a graph generation layer, by integrating state-invariant and state-dependent information, and predict, by a prediction layer, future time-series data on the learned causal graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
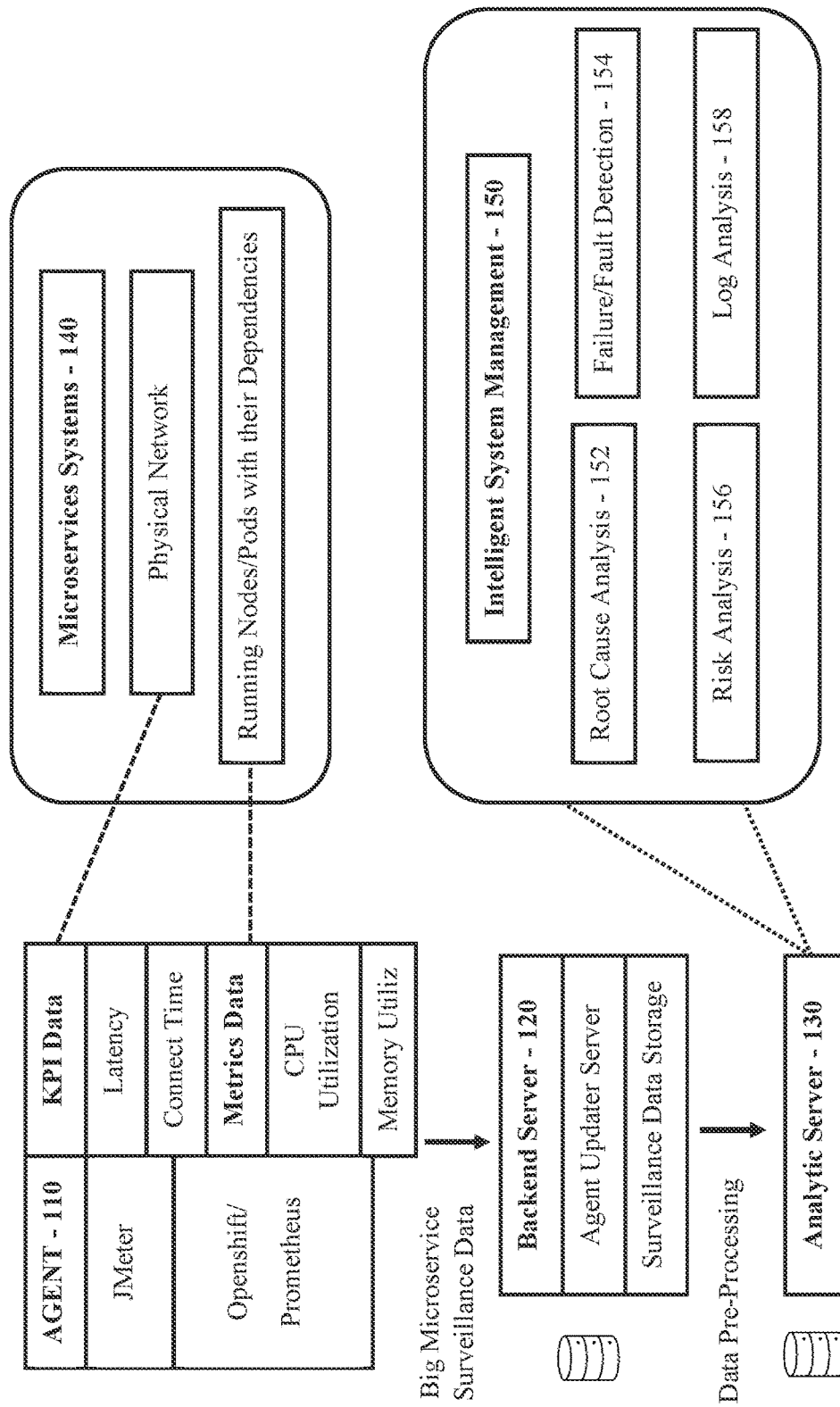
FIG. 1 is a block/flow diagram of an exemplary microservice intelligence system architecture, in accordance with embodiments of the present invention.

Previous root cause analysis (RCA) studies have focused primarily on developing effective offline methods for root cause localization. A key component of many data-driven offline RCA algorithms, especially for the causal discovery based RCA methods, is to learn the causal structure or causal graph that profiles the causal relations between system entities and system key performance indicators (KPIs) based on historical data, so that the operators can trace back the root causes based on the generated causal graph. For instance, conventional methods have utilized historical multivariate monitoring data to construct causal graphs using the conditional interdependence test, and then applied causal intervention to identify the root causes of a microservice system.

However, the traditional offline causal discovery based RCA workflow has its limitations. First, for a new system's faults, the model needs to be retrained/rebuild from scratch. Second, the causal graph learning component is often time-consuming and requires a large amount of historical data to train a robust model. Third, it often requires the operators to manually initiate the RCA process when such operators observe a system fault. As a result, it's often too late to mitigate any damage or loss caused by a system fault. Based on that, the following questions can be asked:

Is it possible to perform a causal discovery-based RCA task efficiently?

How can a person identify the root causes as early as possible?

Can the RCA algorithm be deployed online for the streaming data?

If deployed online, can the time-consuming retraining of the RCA model from scratch be avoided every time a system fault occurs?

In recent years, a very promising means for learning streaming data has emerged through the concept of incremental learning. Such incremental learning models rely on a compact representation of the already observed signals or an implicit data representation due to limited memory resources. In the exemplary RCA task, if the RCA model or causal graph for each batch of the streaming data can be incrementally updated, it virtually accelerates the RCA process. More importantly, the exemplary methods don't need to wait until the system fault occurs to trigger the RCA process. Thus, the exemplary methods can even be able to trigger an early RCA to mitigate the damages and losses. As a result, there exists a need for methods that can incrementally learn the RCA model and automatically trigger the RCA process.

Enlightened by incremental learning, the exemplary methods aim to incrementally update the causal graph from streaming system monitoring data for accurately identifying root causes when a system failure or fault occurs. Formally, given the initial causal graph learned from historical data, and the streaming system monitoring data including entity metrics and KPI data, the goal is to automatically initiate the RCA process when a system fault occurs, incrementally update the initial causal graph by considering each batch of data sequentially, and efficiently identify the top K nodes (e.g., system entities) in the updated causal graph that is most relevant to the system KPI. There are two challenges regarding this task:

The first challenge is identifying the transition points between system states to initiate root cause analysis. As aforementioned, in traditional RCA, the operators often manually initiate the root cause procedure after a system fault occurs. To mitigate the damages or losses, in an online setting, it is needed to automatically detect the system state changes caused by the system fault and trigger the RCA process. The challenge is how to identify the transition points of system states early if the fault does not affect the system KPI, but only affects some root cause system entities at the early stage.

The second challenge is to incrementally update the causal graph model in an efficient manner. After the transition/trigger points are detected, the old RCA model or causal graph cannot be directly applied to identify the root causes, since the old causal graph only includes the causal relations learned from the previous system state data. Although some inherent system dependencies do not change over time (e.g., system state-invariant causation), other causal dependencies may be highly dependent on the system state (e.g., system state-dependent causation). The challenge is how to identify the system state-invariant causation from the old model and quickly learn the state-dependent causation from the new batches of data for accelerating causal graph learning.

To address these challenges, the exemplary methods introduce CORAL, a novel incremental causal graph learning framework, for online root cause localization. CORAL includes trigger point detection, incremental disentangled causal graph learning, and network propagation-based root cause localization. In particular, the first step of CORAL is to detect the transition points between system states in real-time based on system entity metrics and KPI data. To detect trigger points with less delay, the exemplary methods develop an online trigger point detection algorithm based on multivariate singular spectrum analysis and cumulative sum statistics. These points are then used to trigger incremental causal graph learning. Assuming that as the system state transitions, the underlying causal structure partially changes and evolves over time instead of shifting abruptly and significantly. Based on this assumption, the exemplary methods introduce an incremental disentangled causal graph learning model to efficiently learn causal relations by decoupling state-invariant and state-dependent causations. After that, the exemplary methods apply a random walk with restarts to model the network propagation of system faults to accurately identify root causes. The online root cause localization process terminates for the current system fault when the learned causal graph and the generated root cause list converge.

To summarize, the exemplary methods investigate the novel problem of online root cause localization. The exemplary methods propose to solve this problem by automatic trigger point detection and incremental causal structure learning. The exemplary methods introduce a principled framework referred to as CORAL, which integrates a new family of disentangled representation learning (e.g., causal graph disentanglement), online trigger point detection, and incremental causal discovery. System KPI is a monitoring time series that indicates the system status. For example, in a microservice system, latency is a KPI to measure the system status. The lower (higher) a system's latency is, the better (worse) its performance is.

Entity metrics are multivariate time series collected by monitoring numerous system entities/components. For example, in a microservice system, a system entity can be a physical machine, container, virtual machine, pod, and so on. The system metrics include CPU utilization, memory consumption, disk IO utilization, etc. System entities with anomalous metrics can be the root causes of abnormal system latency/connection time, which is a sign of a system fault.

Trigger point or system state change point is the time when the system transitions from one state to another. Real-world systems are dynamic. A system fault can cause a change in the system's status. As the state of a system varies, the underlying causal relationships between its components also change. Thus, to effectively identify root causes in an online setting, it is essential to learn different causal graphs in different states. From this perspective, the system state change points can be viewed as the triggers for updating the causal graph/online RCA model.

Let $X=\{X_1, \ldots, X_N\}$ denote N multivariate metric data. The i-th metric data is $X_i=[x_1^i, \ldots, x_T^i]$, where $x_t^i \in R^M$ is the observation of M system entities at time point t. To reduce notational clutter, the exemplary methods omit the metric index i and use X to represent $X_i$ in the following sections. These observations are non-stationary, and the relationships between various system entities are dynamic and subject to change over time. It is assumed that the underlying state of the system can change when a system fault occurs, and the relationships between system entities in each state are represented by a directed acyclic graph (DAG). For simplicity, the exemplary methods illustrate using the system state transition from $s_p$ to $s_{p+1}$.

The system KPI is y. The monitoring entity metric data of $s_p$ is $\tilde{X}_p \in R^{\rho \times M}$, where $\rho$ is the time length in the state $s_p$. $G_p$ represents the causal graph of $s_p$, which includes nodes representing system KPI or entities, and edges representing causal relations. The data of state $s_{p+1}$ comes one batch at a time, denoted by $\check{X}_{p+1} = [\check{X}_{p+1}^1, \ldots, \check{X}_{p+1}^L]$, where the l-th batch $\check{X}_{p+1}^l \in R^{b \times M}$ and b is the length of each batch of data. The goal is to automatically trigger the RCA process when a system fault occurs, incrementally update $G_p$ to $G_{p+1}$ by considering each batch of data sequentially, and efficiently identify the top K nodes in the causal graph $G_{p+1}$ that are most relevant to y.

FIG. 1 is a block/flow diagram of an exemplary microservice intelligence system architecture 100, in accordance with embodiments of the present invention.

The agent 110 installs the JMeter in the microservice systems 140 to periodically send requests from the JMeter to the microservices systems 140 and collect system-level performance KPI data. The agent 110 also installs Openshift/Prometheus to collect metrics data of all containers/nodes and applications/pods, e.g., central processing unit (CPU) usage and memory usage of a running pod during a period of time. The backend servers 120 receive the data from the agents 110, pre-process them and send them to the analytic server 130. The analytic server 130 runs the intelligent system management programs 150 to analyze the data. The root cause analysis engine 152 identifies the root causes of the system failure/faults. The intelligent system management programs 150 further includes risk analyzer 156, log analyzer 158, and failure/fault detector 154. The techniques of the exemplary embodiments of the present invention are integrated in the root cause analysis engine.

Figure 2:
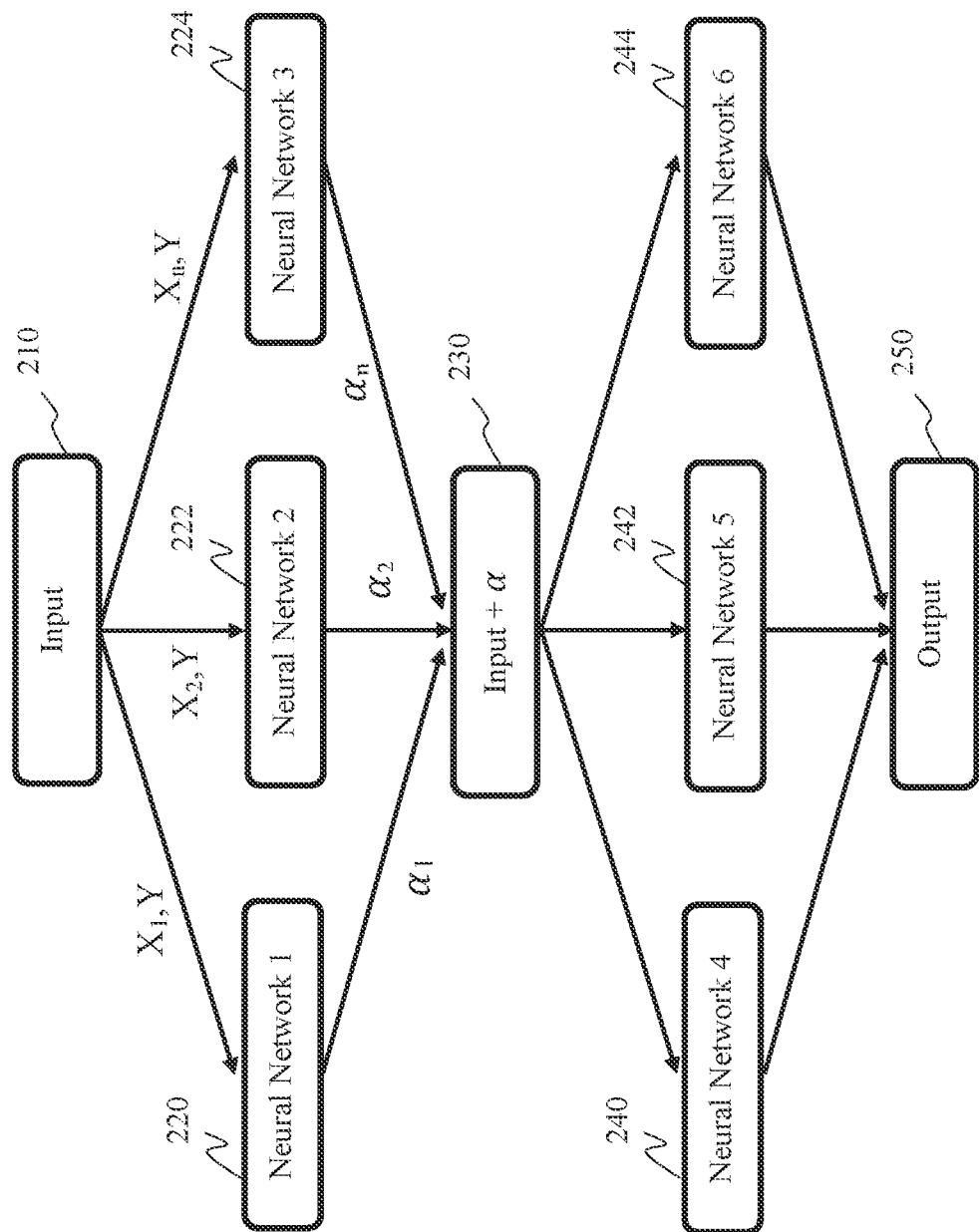
FIG. 2 is a block/flow diagram of an exemplary root cause analysis module, in accordance with embodiments of the present invention.

FIG. 2 is a block/flow diagram of an exemplary root cause analysis module, in accordance with embodiments of the present invention.

The input 210 is provided to a first neural network 220, a second neural network 222, and a third neural network 224, which perform deep neural network based causal analysis. The outputs of the first neural network 220, the second neural network 222, and the third neural network 224 are added with the learned attentions at block 230. Therefore, the low-level input and the learned attentions from the higher level are added. The output is provided to a fourth neural network 240, a fifth neural network 242, and a sixth neural network 244. The fourth neural network 240, the fifth neural network 242, and the sixth neural network 244 perform deep neural network based causal analysis. The output 250 is the root cause rankings and scores.

Figure 3:
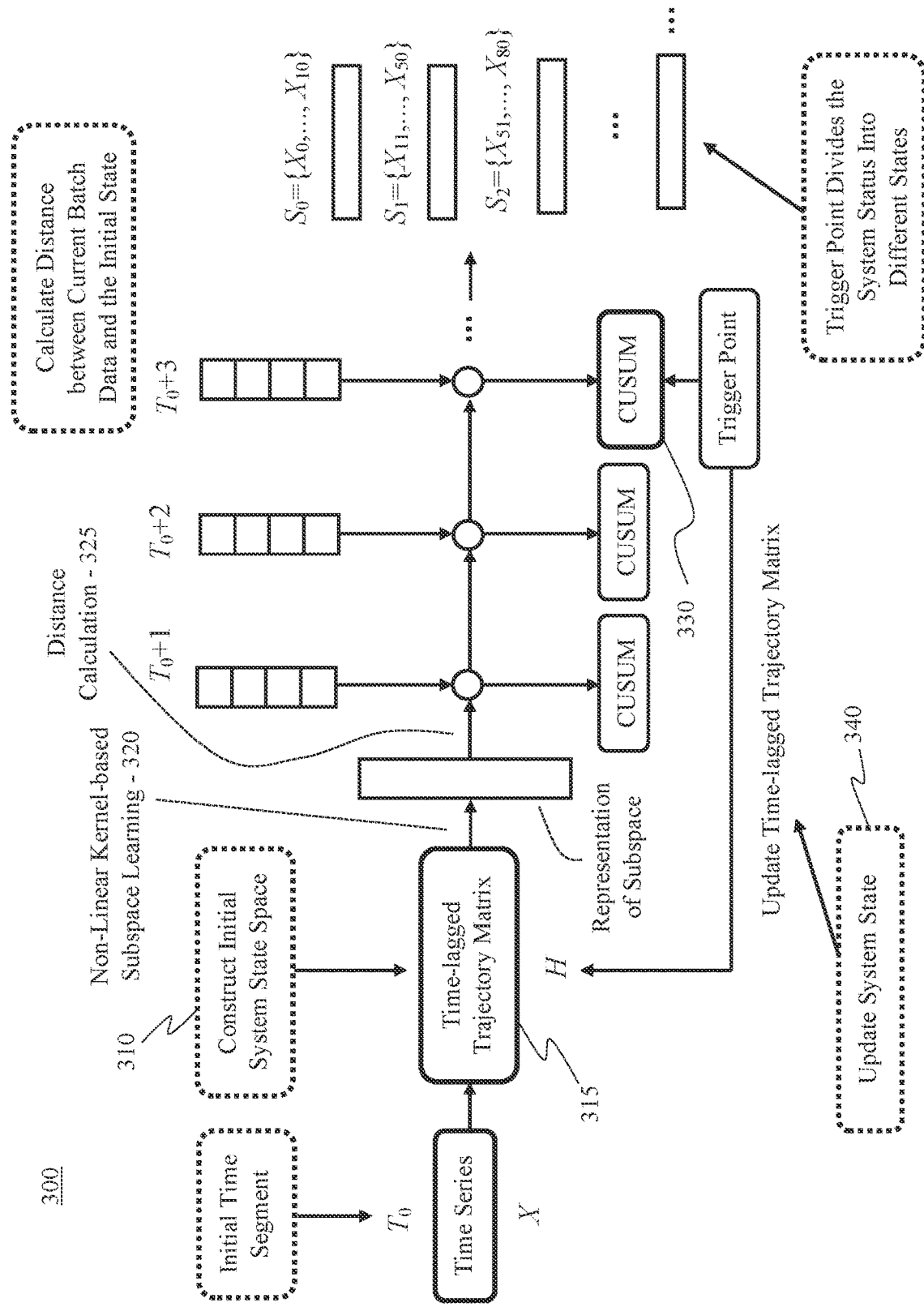
FIG. 3 is a block/flow diagram of an exemplary online trigger point detection system for streaming data, in accordance with embodiments of the present invention.

FIG. 3 is a block/flow diagram of an exemplary online trigger point detection system 300 for streaming data, in accordance with embodiments of the present invention.

The agent 110 (FIG. 1) collects the microservice data by employing the open-source JMeter and Openshift/Prometheus. Two types of monitored data are used in the root cause analysis engine, that is, the JMeter report data of the whole system and the metrics data of the running containers/nodes and the applications/pods.

The JMeter data includes the system performance KPI information such as elapsed time, latency, connect time, thread name, throughput, etc.

It is in the following format: timeStamp, elapsed, label, responseCode, responseMessage, threadName, dataType, success, failureMessage, bytes, sentBytes, grpThreads, allThreads, URL, Latency, IdleTime, Connect_time.

The exemplary methods use the Latency and Connect_time as two key performance KPIs of the whole microservice system. The Latency measures the latency from just before sending the request to just after the first chunk of the response has been received, while Connect_time measures the time it took to establish the connection, including a secure sockets layer (SSL) handshake. Both Latency and Connect_time are time series data, which can indicate the system status and directly reflects the quality of service, that is, whether the whole system had some failure events occur or not, because the system failure would result in the latency or connect time significantly increasing.

The metrics data, on the other hand, includes a number of metrics which indicate the status of a microservice's underlying component/entity. The underlying component/entity can be a microservice's underlying physical machine/container/virtual machine/pod. The corresponding metrics can be the CPU utilization/saturation, memory utilization/saturation, or disk IO utilization. All these metrics data are essentially time series data. An anomalous metric of a microservice's underlying component can be the potential root cause of an anomalous JMeter Latency/Connect_time, which indicates a microservice failure.

For the online trigger point detection, the exemplary methods first construct the initial system state space 310 by the time-lagged trajectory matrix H (315) based on the data X. Then, the exemplary methods learn a robust subspace it $\hat{U}^T$ of the system state by non-linear kernel-based subspace learning 320. After that, the exemplary methods detect the system change by calculating the distance (325) between the new batch of data and the subspace, which can be represented as:

$$D(t) = \|\hat{U}^T @ X(t-L+1:t)\|_F^2 - c$$

where @ refers to a matrix multiplication, X(t−L+1:t) is the new batch of data, and c is an adjustable parameter. Then, D(t) is used to conduct a cumulative sum chart (CUSUM) (330) for detecting root causes based on the following equation:

$$y(t) = \max\{y(t-1) + D(t), 0\}, y(0) = 0.$$

If one trigger point is detected, the time-lagged trajectory matrix is updated (340), which means that the system has achieved to a new state.

Figure 4:
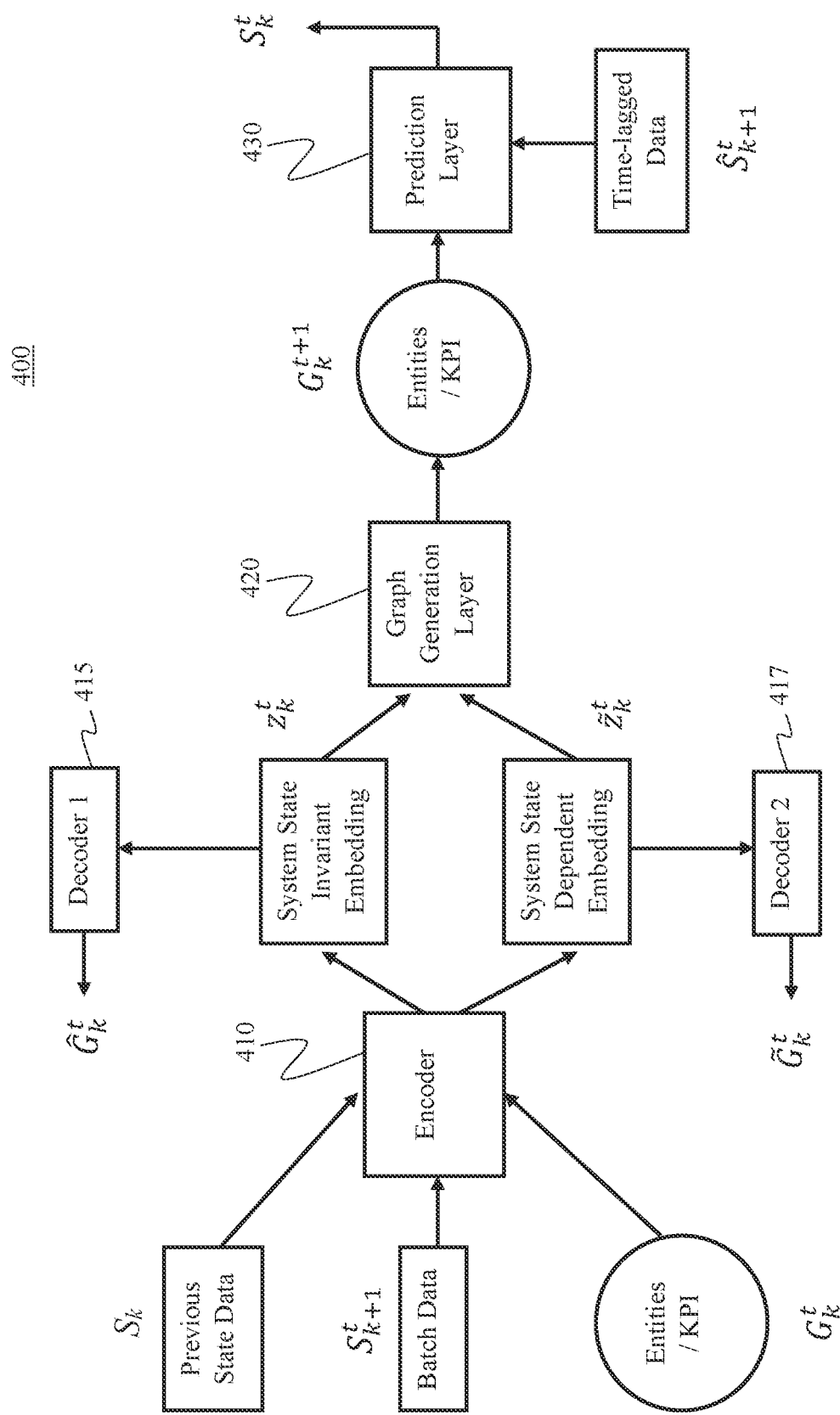
FIG. 4 is a block/flow diagram of an exemplary disentangled graph learning system for incremental causal discovery, in accordance with embodiments of the present invention.

FIG. 4 is a block/flow diagram of an exemplary disentangled graph learning system 400 for incremental causal discovery, in accordance with embodiments of the present invention.

For the incremental causal discovery, there are two learning objectives, that is, to keep system inherent causal relations and to capture system state dependent causal relations. A novel incremental causal discovery framework is presented.

The main modules in this framework are an encoder 410, a graph generation layer 420, and a prediction layer 430. The input of the encoder 410 includes previous system state data $S_k$, the new batch of data in the next system state $S_{k+1}{}^t$, and the causal graph of the previous system state $G_k{}^t$. To obtain the system state invariant embedding, the encoder 410 converts $S_k, S_{k+1}{}^t$, and $G_k{}^t$ into the embedding $z_k{}^t$.

The calculation process is as follows:

$$z_k{}^t = \text{Encoder}(S_k, S_{k+1}{}^t, G_t{}^k)$$

To obtain the system state dependent embedding, the encoder 410 converts $S_{k+1}{}^t$ and $G_k{}^t$ into the embedding $\tilde{z}_k{}^t$.

The converting process can be represented as follows:

$$\tilde{z}_k{}^t = \text{Encoder}(S_{k+1}{}^t, G_t{}^k)$$

Then, the exemplary methods reconstruct the causal graph $G_t{}^k$ based on $z_k{}^t$ and $\tilde{z}_k{}^t$ respectively by decoder 1 (415) and decoder 2 (417).

The process can be represented as follows:

$$\hat{G}_k^t = \text{sigmoid}(z_k^t @ \text{transpose}(z_k^t))$$

$$\tilde{G}_k^t = \text{sigmoid}(\tilde{z}_k^t @ \text{transpose}(\tilde{z}_k^t))$$

Where @ refers to the matrix multiplication operation and transpose refers to the matrix transpose operation. After that, the exemplary methods propose a new graph generation layer 420 to generate the causal graph at the next batch based on $z_k^t$ and $\tilde{z}_k^t$, which can be formulated as follows:

$$G_k^{t+1} = \text{relu}(\tanh(\hat{G}_k^t @ \tilde{G}_k^t - \tilde{G}_k^t @ \hat{G}_k^t))$$

This layer 420 makes the learned causal graph become sparse and reduces the computational cost. The learned new causal graph is input into the prediction layer to fit the current batch of data of new system state for adjusting the learned causal relations.

$$\ddot{S}_{k+1}^t = \text{Prediction}(S_{k+1}^t, G_{k+1}^{t+1})$$

The optimization objective of the whole process is as follows:

$$L_{total} = L_1 + L_2 + L_3$$

$$L_1 = \text{cross\_entropy}(G_k^t, \widehat{G_k^t}) + \text{KL}\{q(z_k^t) \| p(z_k^t | S_k, S_{k+1}^t)\}$$

$$L_2 = \text{cross\_entropy}(G_k^t, \tilde{G}_k^t) + \text{KL}\{q(\tilde{z}_k^t) \| p(z_k^t | S_{k+1}^t)\}$$

$$L_3 = \text{MSE}(S_{k+1}^t, f(G_k^{t+1}, \hat{S}_{k+1}^t))$$

After the model converges, the causal graph is input into a root cause analysis algorithm to output the top-k pods/applicates as root causes of system failures.

Therefore, the exemplary methods propose CORAL, a novel online RCA framework that can automatically trigger the RCA process and incrementally update the RCA model. CORAL includes trigger point detection, incremental disentangled causal graph learning, and network propagation-based root cause localization. The trigger point detection component aims to detect system state transitions automatically and in near real-time. To achieve this, the exemplary methods develop an online trigger point detection approach based on multivariate singular spectrum analysis and cumulative sum statistics. To efficiently update the RCA model, the exemplary methods propose an incremental disentangled causal graph learning approach to decouple the state-invariant and state-dependent information. After that, CORAL applies a random walk with restarts to the updated causal graph to accurately identify root causes. The online RCA process terminates when the causal graph and the generated root cause list converge.

Figure 5:
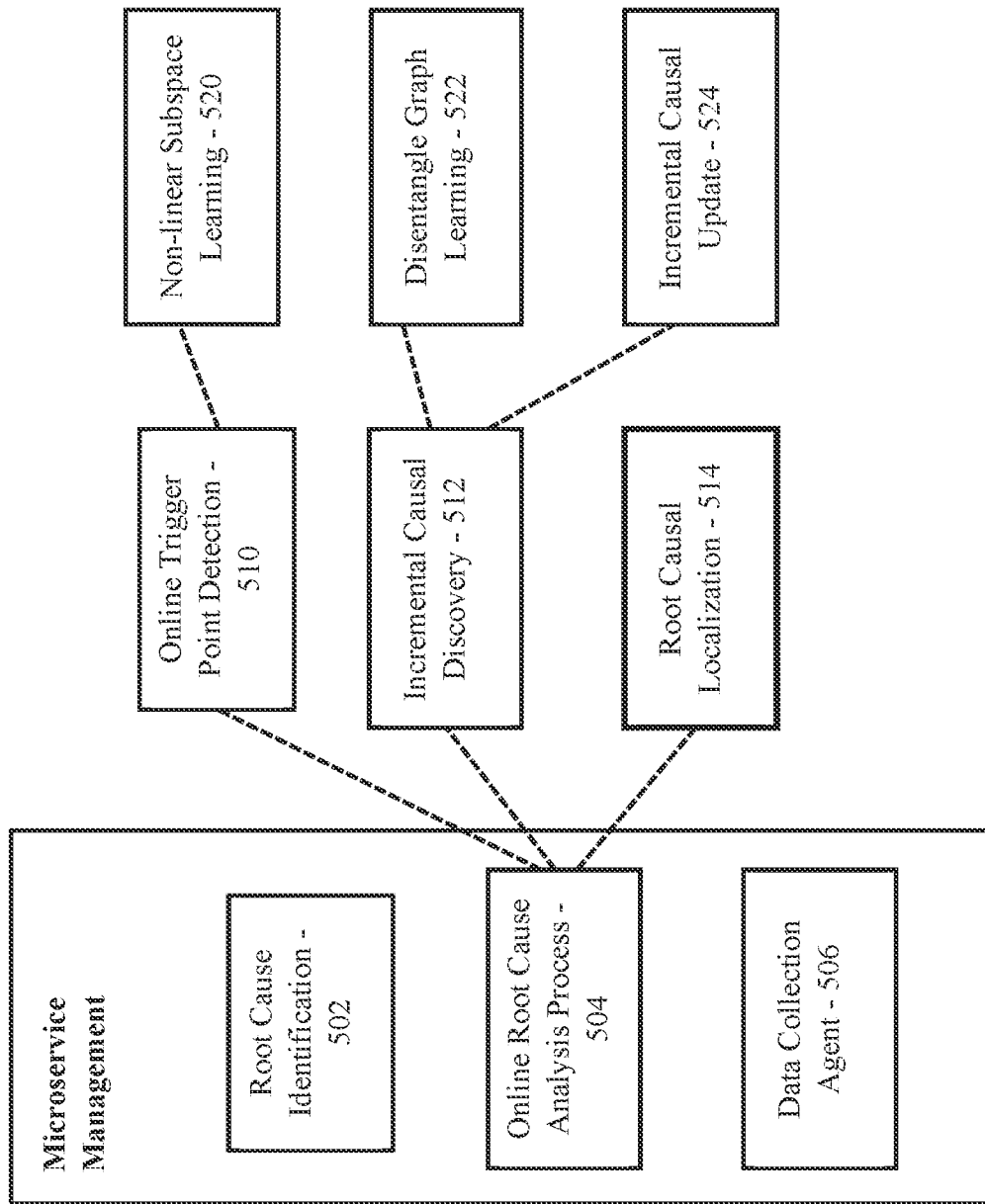
FIG. 5 is a block/flow diagram of an exemplary workflow for root cause identification, in accordance with embodiments of the present invention.

FIG. 5 is a block/flow diagram of an exemplary workflow for root cause identification, in accordance with embodiments of the present invention.

The microservice management component includes a root cause identifier 502, an online root cause analyzer 504, and a data collection agent 506.

The online root cause analyzer 504 enables online trigger point detection 510, incremental causal discovery 512, and root cause localization 514.

The online trigger point detection 510 involves nonlinear subspace learning 520.

The incremental causal discovery 512 involves disentangle graph learning 522.

The root causal localization 514 involves incremental causal updates 524.

Figure 6:
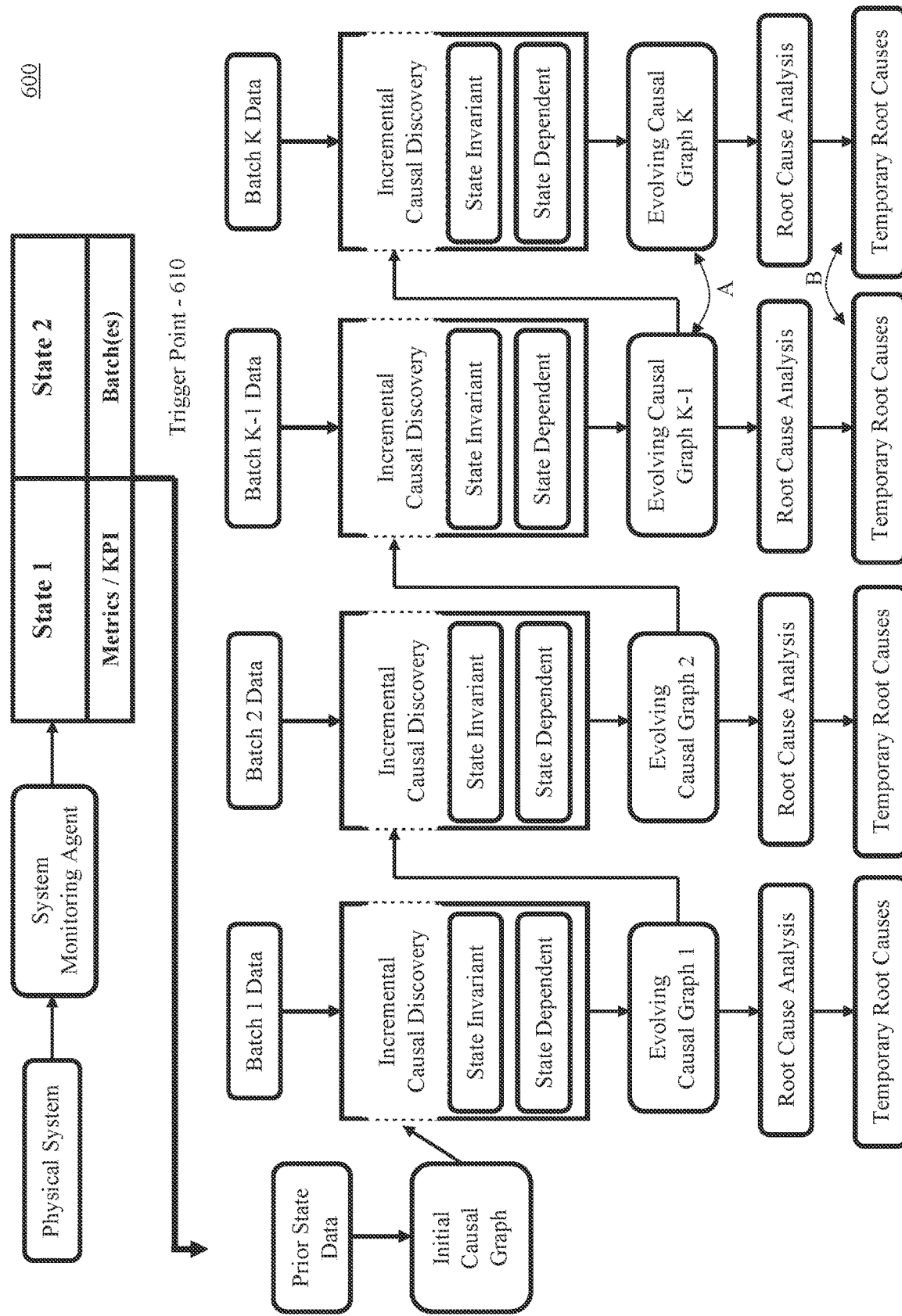
FIG. 6 is a block/flow diagram of an exemplary framework for detecting trigger points using monitoring entity metrics and key performance indicator (KPI) data, in accordance with embodiments of the present invention.

FIG. 6 is a block/flow diagram of an exemplary framework 600 for detecting trigger points using monitoring entity metrics and key performance indicator (KPI) data, in accordance with embodiments of the present invention.

FIG. 6 shows the proposed framework CORAL for online root cause localization. Specifically, CORAL addresses the discussed challenges with the following contributions:

Online trigger point detection detects transition points between system states and triggers incremental causal structure learning.

Incremental disentangled causal graph learning is a novel disentangled graph learning method that enables efficient causal structure learning by decoupling state-invariant and state-dependent causations.

Network propagation-based root cause localization models the network propagation of system faults to accurately identify the most possible root causes.

The goal is to detect the trigger points by integrating both entity metrics and system KPI data. The exemplary embodiments model the underlying dynamics of system entity metrics and KPI data (e.g., multivariate time series observations) through the Multivariate Singular Spectrum Analysis (MSSA) model. For simplicity, the exemplary methods add the system KPI, y, as one dimension to the metric data, X, to illustrate the model.

Specifically, given monitoring metric data X, the exemplary methods first construct the base matrix, denoted by $Z_x$, by using the previous $T_0$ records. The requirement for the initial value of $T_0$ is that no system state transition occurs in the time segment $t \leq T_0$. Å

The singular vectors of $Z_x$ are then grouped into two matrices $\hat{U}_0$ and $\hat{U}_\perp$.

The exemplary methods estimate the pre-change subspace $\hat{L}_0$ as follows:

$$\hat{L}_0 = \text{span}(\hat{U}_0) \qquad (1)$$

Meanwhile, let $\hat{L}_\perp = \text{span}(\hat{U}_\perp)$ be the orthogonal complement of the subspace $\hat{L}_0$. After that, for the new data $t > T_0$, the exemplary methods build the L-lagged matrix $X(t-L+1:t)$. The Euclidean distance between the L-lagged matrix and the estimated subspace $\hat{L}_0$ is computed as the detection score, which can be defined as:

$$D(t) = \|\hat{U}_\perp^* X(t-L+1:t)\|_F^2 - c \qquad (2)$$

where $c \geq 0$ is the shift-downwards constant. Moreover, the cumulative detection score is computed using the cumulative sum (CUSUM) statistics, which can be defined as:

$$y(t) = \max\{y(t-1) + D(t), 0\} \quad y(T_0) = 0 \qquad (3)$$

if the y(t)=0, the exemplary methods proceed to check the next time point. Otherwise, the change point is identified when y(t)>h, where h is a predefined threshold.

This process can be defined as:

$$\hat{\tau} = \inf_{t > T_0}\{t | y(t) \geq h\} \qquad (4)$$

The change point $\hat{\tau}$ is the trigger for incremental causal graph learning. To recheck the next change point, the base matrix is updated with the time segment $X(\hat{\tau}, \hat{\tau}+T_0-1)$. This model can detect trigger points in nearly real-time.

Figure 7A:
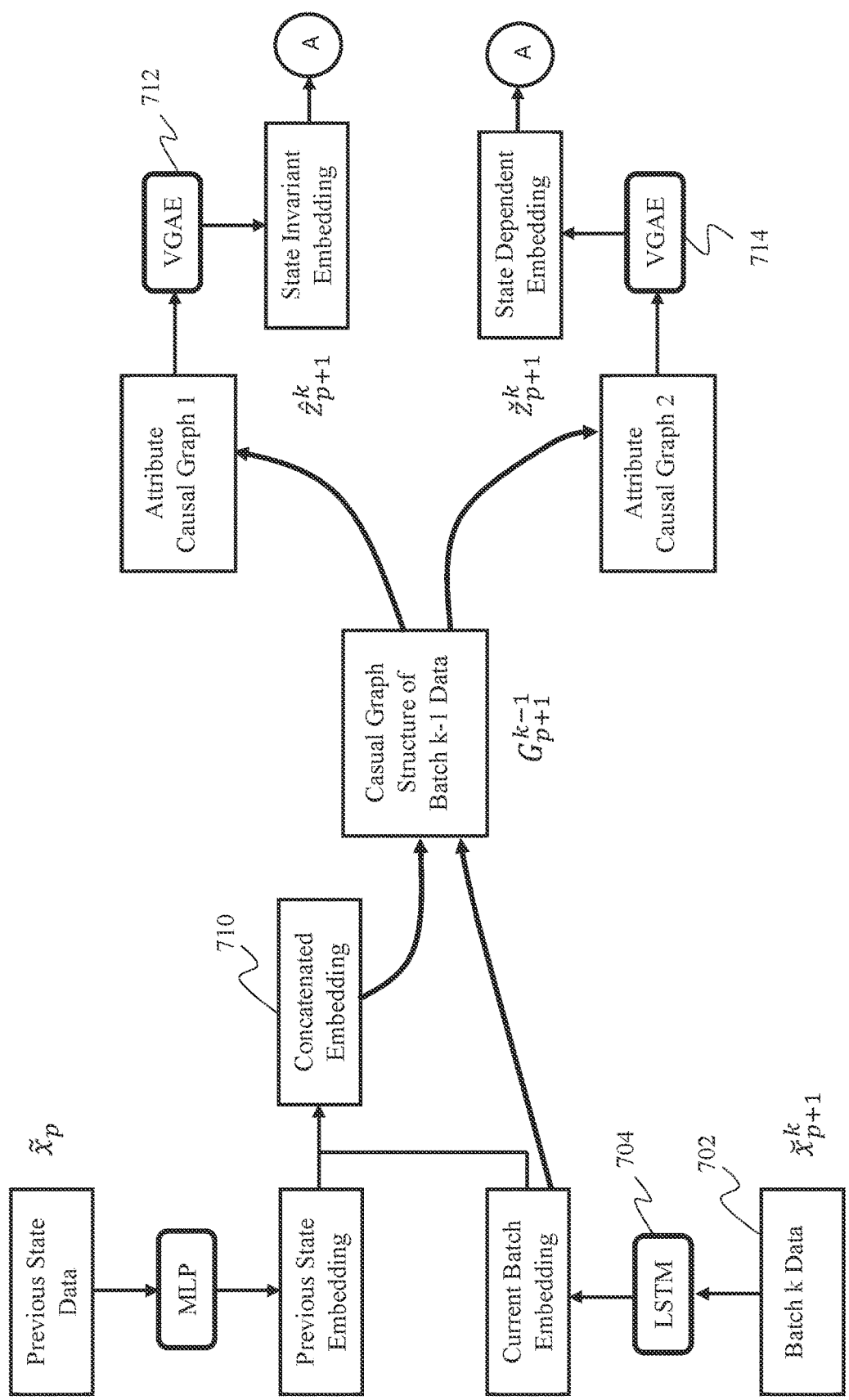
FIGS. 7A-7C are block/flow diagrams of an exemplary framework for incremental disentangled causal graph learning, in accordance with embodiments of the present invention.
Figure 7B:
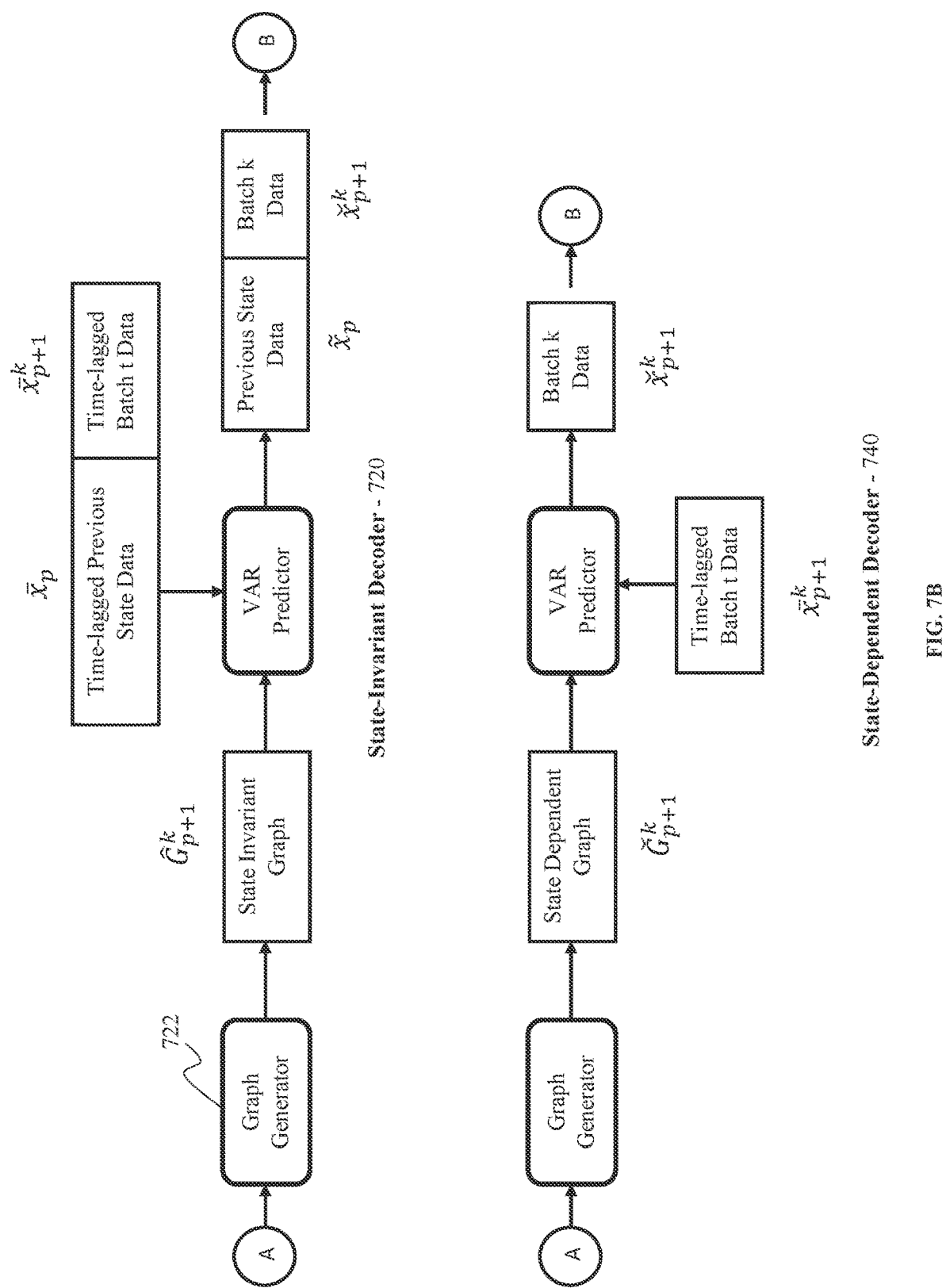
Figure 7C:
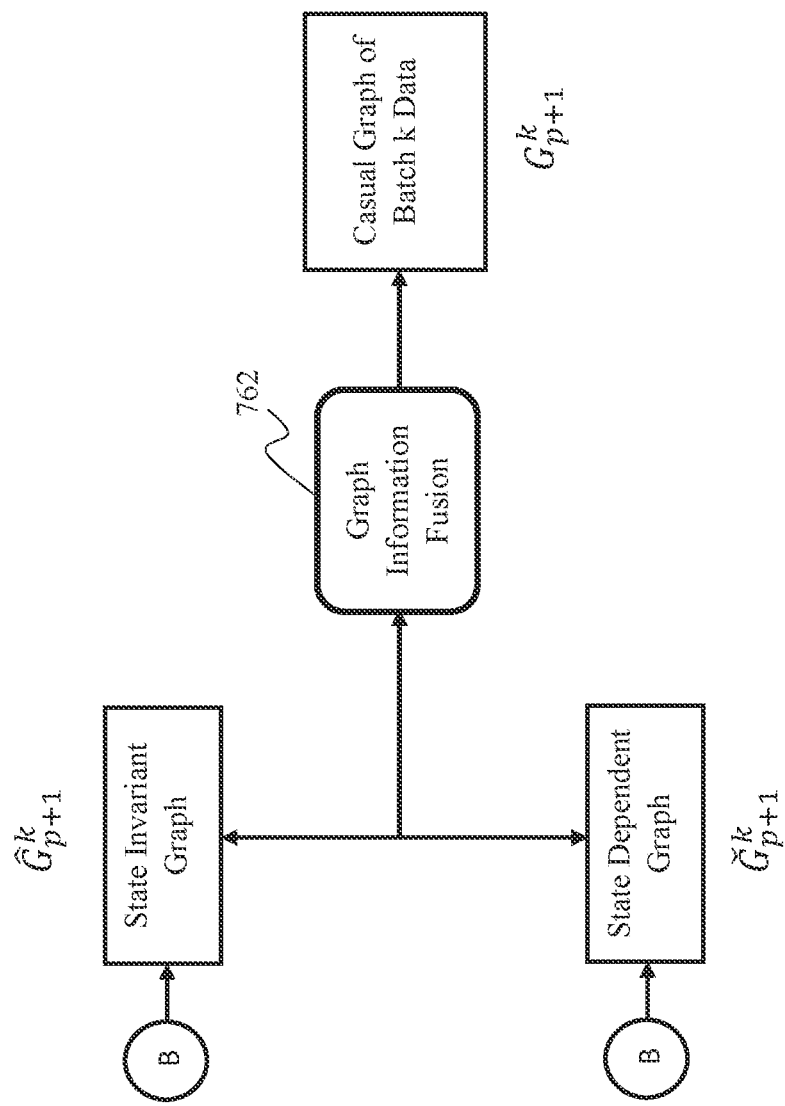

FIGS. 7A-7C is a block/flow diagram of an exemplary framework 700 for incremental disentangled causal graph learning, in accordance with embodiments of the present invention.

After a trigger point is detected, the exemplary methods propose a disentangled causal graph learning model by integrating state invariant and state-dependent information, as well as incremental learning.

The system state encoder 700 aims to decouple state-invariant and state-dependent information in order to produce corresponding embeddings. State-invariant and state-dependent decoders aim to reconstruct and refine state-invariant and state-dependent causal relations, respectively. The causal graph fusion module aims to fuse state-invariant and state-dependent causation in order to obtain the new causal graph.

The goal of the system state encoder 700 is to aggregate the information from system state data and the corresponding causal graph. The exemplary methods use the k-th batch data 702 to illustrate the design. For simplicity, it is assumed that the previous state data $\tilde{X}_p$ and the batch of new state data $\check{X}_{p+1}^k$ both have the system KPI y as one dimension.

Given $\tilde{X}_p$, $\check{X}_{p+1}^k$ and the causal graph at the k−1 batch $G_{p+1}^{k-1}$, the exemplary methods aim to integrate their information into state-invariant and state-dependent embeddings, respectively. First, a fully-connected linear layer is employed to preserve the information of $\tilde{X}_p$ into a latent representation $U_p$, which can be defined as:

$$U_p \tilde{X}_p \cdot W_p + b_p \quad (5)$$

where $W_p$ and $b_p$ are the weight matrix and bias item of the linear layer, respectively.

Then, to track the information change in the state p+1's data batch, the exemplary methods employ a recurrent function $f(\bullet,\bullet)$. The function $f(\bullet,\bullet)$ takes $\check{X}_{p+1}^k$ and the previous hidden state $H_{p+1}^{k-1}$ as inputs and outputs a latent representation $H_{p+1}^k$, which is defined as:

$$H_{p+1}^k = f(\check{X}_{p+1}^k, H_{p+1}^{k-1}) \quad (6)$$

A long short-term memory network (LSTM) 704 is employed to implement $f(\bullet,\bullet)$. Due to the computational overhead, the exemplary methods do not use the passed batch of data to update the new causal graph. Thus, it is effective to track the causal dynamics using the LSTM module.

In addition, because state-invariant causal relations would be affected by both the previous state data and the new batch of data, whereas state-dependent causal relations are only affected by the new batch of data, to obtain the state-invariant embedding $\hat{Z}_{p+1}^k$, the exemplary methods first concatenate $U_p$ and $H_{p+1}^k$ together (710), and then map it to the causal graph $G_{p+1}^{k-1}$ as the node embeddings. After that, the exemplary methods employ the mapping function $g(\bullet,\bullet)$ to convert the attributed graph into the state-invariant embedding, which is defined as:

$$\hat{Z}_{p+1}^k = g(A_{p+1}^{k-1}, \text{Concat}(U_p, H_{p+1}^k)) \quad (7)$$

where $A_{p+1}^{k-1}$ represents the adjacency matrix of $G_{p+1}^{k-1}$ and Concat represents the concatenated operation. To implement the function $g(\bullet)$, the exemplary methods employ a variational graph autoencoder (VGAE) 712. VGAE 712 embeds all information into an embedding space that is smooth and continuous. This is helpful for capturing the causal dynamics between different system entities. To obtain the state-dependent embedding $\check{Z}_{p+1}^k$, the exemplary methods only map $H_{p+1}^k$ to $G_{p+1}^{k-1}$ as its attributes, and then employ another VGAE 714 layer to convert the attributed graph to the state-dependent embedding.

This process can be defined as:

$$\check{Z}_{p+1}^k = g(A_{p+1}^{k-1}, H_{p+1}^k) \quad (8)$$

Regarding the state-invariant decoder 720, the goal of the state-invariant decoder is to learn the invariant causal relations across two system states. To recover the state-invariant part, the exemplary methods first feed $\hat{Z}_{p+1}^k$ into the graph generator layer 722 to generate the corresponding state-invariant graph $\hat{G}_{p+1}^k$, which is defined as:

$$\hat{G}_{p+1}^k = \text{Sigmoid}(\hat{Z}_{p+1}^k \cdot \hat{Z}_{p+1}^{k*}) \quad (9)$$

where Sigmoid is an activation function and $(\bullet)^*$ is a transpose operation. But since this process constructs the graph using the state-invariant embeddings only, it can't guarantee that the state-invariant causal relationships are shown accurately in this graph. To overcome this issue, two optimization objectives must be met, that is, making $\hat{G}_{p+1}^k$ as similar to the previous causal graph $G_{p+1}^{k-1}$ as possible and fitting $\hat{G}_{p+1}^k$ to both the previous and new state data batches.

To achieve the first objective, the reconstruction loss $L_{\hat{G}}$ is minimized, which is defined as:

$$L_{\hat{G}} = \|\hat{A}_{p+1}^k - A_{p+1}^{k-1}\|^2 \quad (10)$$

where $\hat{A}_{p+1}^k$ and $A_{p+1}^{k-1}$ are the adjacency matrices of a $\hat{G}_{p+1}^k$ and $G_{p+1}^{k-1}$, respectively. To achieve the second objective, the exemplary methods fit the graph and data with a structural vector autoregressive (SVAR) model. More specifically, given the time-lagged data of the previous state $\overline{X}_p$ and the current new batch $\overline{X}_{p+1}^k$, the SVAR-based predictive equations can be defined as:

$$\begin{cases} \tilde{X}_p = \overline{X}_p \cdot \hat{A}_{p+1}^k + \overline{X}_p \cdot \hat{D}_{p+1}^k + \tilde{o}_p \\ \check{X}_{p+1}^k = \check{X}_{p+1}^k \cdot \hat{A}_{p+1}^k + \overline{X}_{p+1}^k \cdot \hat{D}_{p+1}^k + \check{o}_{p+1}^k \end{cases} \quad (11)$$

where $\tilde{o}_p$ and $\check{o}_{p+1}^k$ are vectors of centered error variables; $\hat{A}_{p+1}^k$ is used to capture causal relations among system entities, and the weight matrix $\hat{D}_{p+1}^k$ is used to model the contribution of time-lagged data for the predictive task. $\hat{A}_{p+1}^k$ and $\hat{D}_{p+1}^k$ are used to predict both the past state data and the current batch of data.

To ensure the accuracy of learned causal structures, the exemplary methods minimize two predictive errors $L_{\tilde{p}}$, and $L_{\check{p}}$, which are defined as:

$$\begin{cases} L_{\tilde{p}} = \left\| \tilde{X}_p - \left( \overline{X}_p \cdot \hat{A}_{p+1}^k + \overline{X}_p \cdot \hat{D}_{p+1}^k \right) \right\|^2 \\ L_{\check{p}} = \left\| \check{X}_{p+1}^k - \left( \check{X}_{p+1}^k \cdot \hat{A}_{p+1}^k + \overline{X}_{p+1}^k \cdot \hat{D}_{p+1}^k \right) \right\|^2 \end{cases} \quad (12)$$

Regarding the state-dependent decoder 740, the goal of the state-dependent decoder is to learn the new causal relations introduced by the new batch of data. Similar to the learning process of the state-invariant decoder, the exemplary methods first generate the state-dependent graph $\check{G}_{p+1}^k$ by applying the same strategy on the embedding $\check{Z}_{p+1}^k$, which is defined as:

$$\check{G}_{p+1}^k = \text{Sigmoid}(\check{Z}_{p+1}^k \cdot \check{Z}_{p+1}^{k*}) \quad (13)$$

To ensure the causal graph $\check{G}_{p+1}^k$ is brought by the new batch of data $\check{X}_{p+1}^k$, two optimization objectives must be met, that is, making $\check{G}_{p+1}^k$ as similar to the complement of the previous causal graph as possible and fitting $\check{G}_{p+1}^k$ to the new batch of data. To achieve the first objective, the reconstruction loss $L_{\check{G}}$ is minimized, which is defined as:

$$L_{\check{G}} = \|\check{A}_{p+1}^k - (:A_{p+1}^{k-1})\|^2 \quad (14)$$

where $(:A_{p+1}^{k-1})$ refers to the inversion of each element in the adjacency matrix $A_{p+1}^{k-1}$ and $\check{A}_{p+1}^k$ is the adjacency matrix of $\check{G}_{p+1}^k$.

To achieve the second objective, a predictive equation using SVAR is defined:

$$\breve{Y}_{p+1}^k = \breve{X}_{p+1}^k \cdot \breve{A}_{p+1}^k + \overline{X}_{p+1}^k \cdot \breve{D}_{p+1}^k + \grave{o} \quad (15)$$

where $\breve{A}_{p+1}^k$ captures the new causal relations introduced by the new data batch $\breve{X}_{p+1}^k$ and $\breve{D}_{p+1}^k$ is to model the contribution of time-lagged data for prediction. To ensure the accuracy of learned causal structures, the predictive error $L_{\tilde{p}}$ is minimized, which is defined as:

$$L_{\tilde{p}} = \|\breve{X}_{p+1}^k - (\breve{X}_{p+1}^k \cdot \breve{A}_{p+1}^k + \overline{X}_{p+1}^k \cdot \breve{D}_{p+1}^k)\|^2 \quad (16)$$

Regarding the causal graph fusion 760, from the state-invariant decoder and state-dependent decoder, the exemplary methods can obtain the state-invariant causal graph $\hat{G}_{p+1}^k$ and the state-dependent causal graph $\breve{G}_{p+1}^k$, respectively. To generate the causal graph $G_{p+1}^k$, for the current batch of data, simple addition will not work because it may result in dense and cyclical graphs. Here, a new graph fusion layer 762 is presented to fuse the two causal graphs, which can be formulated as follows:

$$A_{p+1}^k = \text{RELU}(\tanh(\hat{A}_{p+1}^k \cdot \breve{A}_{p+1}^{k*} - \breve{A}_{p+1}^k \cdot \hat{A}_{p+1}^{k*})) \quad (17)$$

where $A_{p+1}^k$ is the adjacency matrix of $G_{p+1}^k$. The subtraction term, tanh, and RELU activation functions may regularize the adjacency matrix so that if the element in $A_{p+1}^k$ is positive, its diagonal counterpart element will be zero. To strictly force the $G_{p+1}^k$, to be unidirectional and acyclic, the exemplary methods adopt the following exponential trace function as constraints.

$$h(A_{p+1}^k) = tr\left(e^{A_{p+1}^k \circ A_{p+1}^k}\right) - M \quad (18)$$

where ∘ is the Hadamard product of two matrices and M is the number of nodes (e.g., system entities). This function satisfies $h(A_{p+1}^k) = 0$ if and only if $A_{p+1}^k$ is acyclic.

Regarding optimization, to generate a robust casual graph for the new data batch, the exemplary methods jointly optimize all the preceding loss functions.

Thus, the final optimization objective is defined as:

$$L = L_{\hat{G}} + L_{\breve{G}} + L_{\tilde{p}} + L_{\tilde{p}} + \lambda_1 \cdot (\|\hat{A}_{p+1}^k\|_1 + \|\breve{A}_{p+1}^k\|_1) + \lambda_2 \cdot h(A_{p+1}^k) \quad (19)$$

where $\|\cdot\|_1$ is the L1-norm, which is used to increase the sparsity of $\hat{G}_{p+1}^k$ and $\breve{G}_{p+1}^k$ to reduce the computational cost, where $\lambda_1$ and $\lambda_2$ control the penalized degree of regularization items.

Regarding model convergence, the discovered causal structure and the associated root cause list may gradually converge as the number of new data batches increases. So the exemplary methods incorporate them as an indicator to automatically terminate the online RCA to avoid unnecessary computing resource waste.

It is assumed that two consecutive causal graphs are $G_{p+1}^{K-1}$, $G_{p+1}^{K}$, and the associated root cause lists are $I_{p+1}^{K-1}$, $I_{p+1}^{K}$.

The node set of the two causal graphs is fixed. The edge distribution should be comparable when the causal graph converges. Thus, the exemplary methods define the graph similarity $\zeta_G$ using the Jensen-Shannon divergence as follows:

$$\zeta_G = 1 - JS(P(G_{p+1}^{K-1}) \| P(G_{p+1}^{K})) \quad (20)$$

where P(•) refers to the edge distribution of the corresponding graph. $\zeta_G$ has a value range of [0:1]. The greater the value of $\zeta_G$ is, the closer the two graphs are.

The exemplary methods use the rank-biased overlap metric (RBO) to calculate the similarity between two root cause lists in order to fully account for the changing trend of root cause rank. The ranked list similarity $\zeta_I$ is defined as:

$$\zeta_I = \text{RBO}(I_{p+1}^{K-1}, I_{p+1}^{K}) \quad (21)$$

$\zeta_I$ has a value range of [0:1]. The greater the value of $\zeta_I$ is, the more similar the two root cause lists are. The exemplary methods use a hyperparameter $\alpha \in [0:1]$ to integrate $\zeta_G$ and $\zeta_I$, defined as:

$$\zeta = \alpha \cdot \zeta_G (1-\alpha) \cdot \zeta_I \quad (22)$$

The online RCA process may stop when $\zeta$ is less than a threshold.

Regarding network propagation-based root cause localization, after obtaining the causal graph $G_{p+1}^k$, there are two kinds of nodes, that is, system entities and system KPI in the graph. However, the system entities linked to the KPI may not always be the root causes. This is because the malfunctioning effects spread to neighboring entities starting from the root causes. The exemplary methods present a random walk-based method for capturing such patterns and more precisely locating root causes. For simplicity, the exemplary methods directly use G to represent $G_{p+1}^k$. To trace back the root causes, the exemplary methods first transpose the learned causal graph to get G*, then adopt a random walk with restarts on the transposed causal graph to estimate the probability score of each entity by starting from the KPI node.

Specifically, it is assumed that the transition probabilities of a particle on the transposed structure may be represented by H, which has the same shape as the adjacency matrix of G*. Each element in H indicates the transition probability between any two nodes. Imagine that from the KPI node, a particle begins to visit the causal structure. It jumps to any one node with a probability value $\phi \in [0,1]$ or stays at the original position with $1-\phi$. The higher the value of $\phi$ is, the more possible the jumping behavior happens. Specifically, if the particle moves from node i to node j, the moving probability in H should be updated by:

$$H[i, j] = (1-\phi) A^* \cdot [i, j] / \sum_{\kappa=1}^{M} A^* \cdot [i, \kappa] \quad (23)$$

where A* is the adjacency matrix of G*. During the visiting exploration process, the exemplary methods may restart from the KPI node to revisit other entities with the probability $\varphi \in [0,1]$. Thus, the visiting probability transition equation of the random walk with restarts can be formulated as:

$$q_{\tau+1} = (1-\varphi) \cdot q_{\tau} + \varphi \cdot q_{\xi} \quad (24)$$

where $q_{\tau}$ and $q_{\tau+1}$ are the visiting probability distributions at the $\tau$ and $\tau+1$ steps, respectively. $q_{\xi}$ is the initial visiting probability distribution at the initial step. When the visiting probability distribution converges, the probability scores of the nodes are used as their causal scores to rank them. The top-K ranked nodes are the most likely root causes of the associated system fault.

In conclusion, the exemplary embodiments introduce an online root cause analysis framework, which includes online trigger point detection and incremental causal discovery. For the first part, the exemplary methods propose a non-linear kernel-based subspace learning method for detecting the system state change points. A monitoring agent is designed based on JMeter and Openshift/Prometheus to collect the performance KPI and metrics data from the whole system and the underlying system components. To learn the representation of the system state, the exemplary methods use a time-lagged trajectory matrix to collect data and leverage non-linear kernel-based matrix decomposition to learn a robust subspace. To detect the system change point accurately, the exemplary methods employ CUSUM to accumulate the distribution error until achieving the threshold. For the second part, the exemplary methods propose a disentangle graph learning-based incremental causal discovery framework. To efficiently learn the causal graph, the exemplary methods present a two-branch disentangle learning framework. The first branch is to learn the state-invariant causal information and the second branch is to learn the state-dependent causal information. To merge the two branch results, the exemplary methods introduce a new graph learning layer that can produce sparse and directed acyclic causal graphs. To justify the quality of the learned causal graph, the exemplary methods utilize a prediction layer to predict the future time-series data based on the learned causal graph.

The proposed online trigger point detection method extends the traditional linear-based change point detection method to non-linear. The matrix-decomposition-based subspace learning ensures the computational efficiency of online trigger point detection. Hence, the detection algorithm can be conducted in a short delay time, which is the cornerstone of the online root cause analysis. The proposed causal discovery first utilizes the disentangle-graph learning method to efficiently learn causal graphs over system state changes. The disentangle learning process reduces the computational cost of traditional causal discovery.

The proposed method is more accurate (higher quality) on root cause identification, hence the generated root causes will have less false positives and false negatives based on the discovered results of hierarchical root causes. Traditional root cause analysis methods are conducted offline. When finding a system failure, operators must recollect historical data and rebuild the causal discovery model. In comparison to such approaches, the exemplary method is an online root cause analysis that can automatically detect the early phenomenon of system failures and incrementally update learned causal graphs to effectively locate root causes. The proposed method can detect root causes of system failures in real-time.

Figure 8:
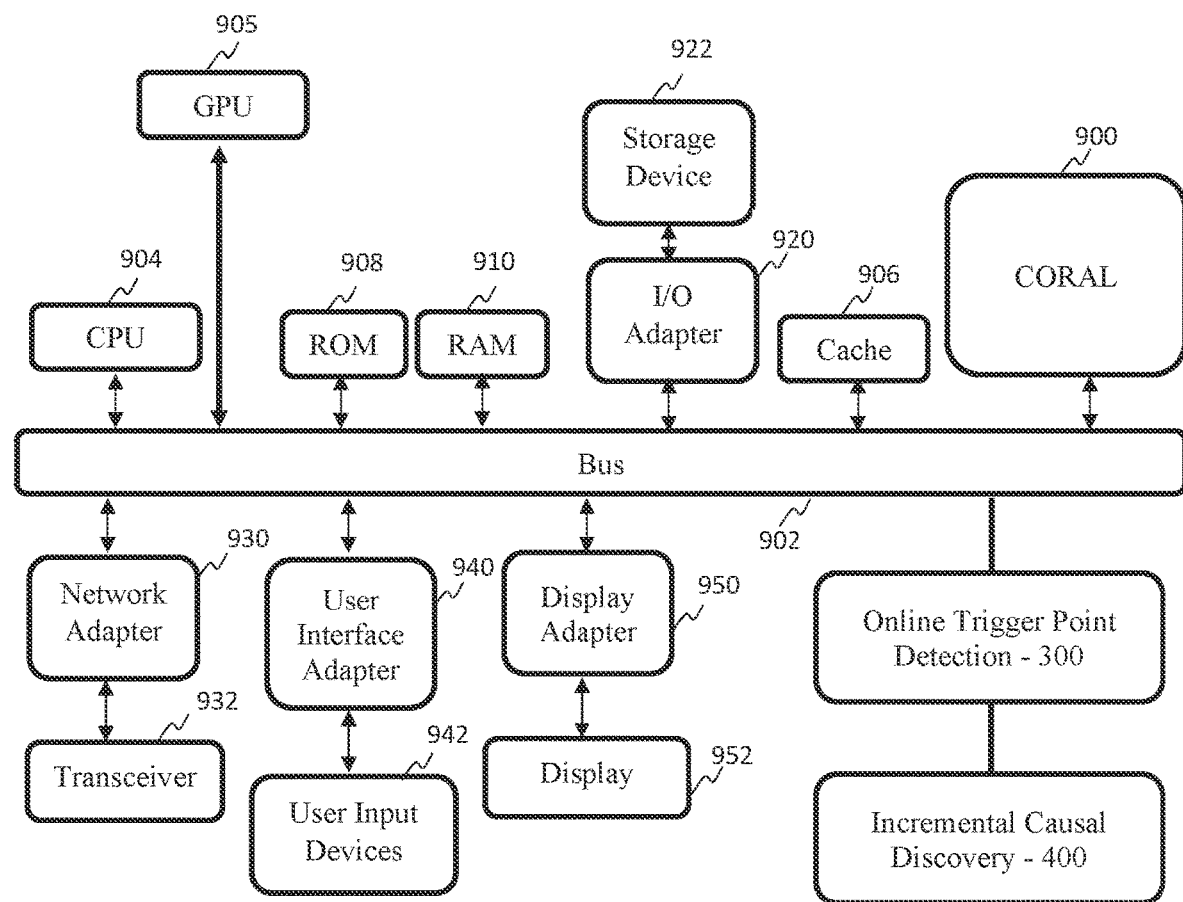
FIG. 8 is a block/flow diagram of an exemplary processing system for automatically triggering a root cause analysis process, in accordance with embodiments of the present invention.

FIG. 8 is an exemplary processing system for automatically triggering a root cause analysis process, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, CORAL 900 is presented including online trigger point detection 300 and incremental causal discovery 400.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 9:
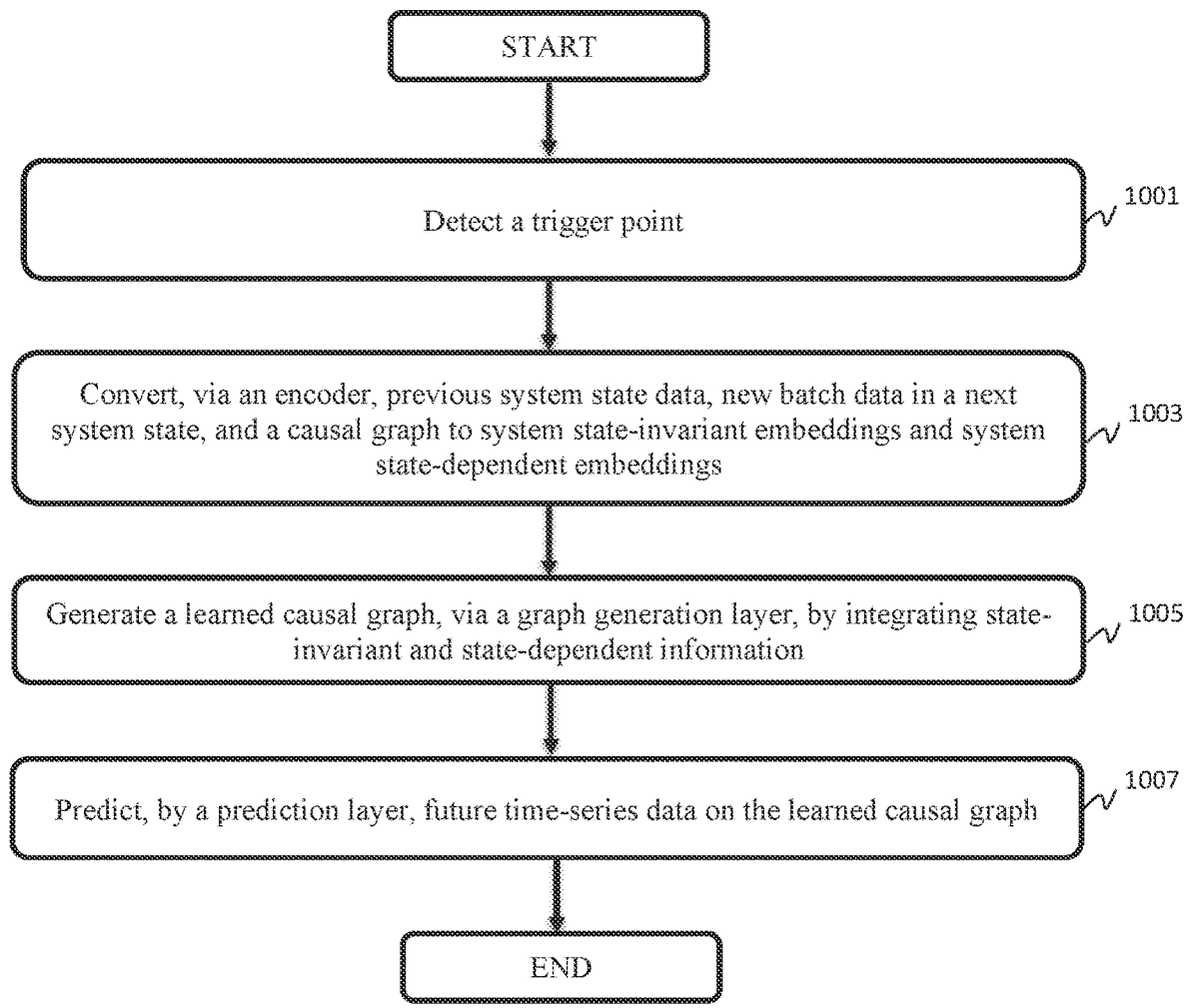
FIG. 9 is a block/flow diagram of an exemplary method for automatically triggering a root cause analysis process, in accordance with embodiments of the present invention.

FIG. 9 is a block/flow diagram of an exemplary method for automatically triggering a root cause analysis process, in accordance with embodiments of the present invention.

At block 1001, detect a trigger point.

At block 1003, convert, via an encoder, previous system state data, new batch data in a next system state, and a causal graph to system state-invariant embeddings and system state-dependent embeddings.

At block 1005, generate a learned causal graph, via a graph generation layer, by integrating state-invariant and state-dependent information.

At block 1007, predict, by a prediction layer, future time-series data on the learned causal graph.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for identifying root cause failure and fault events, the method comprising:
   detecting a trigger point;
   converting, via an encoder, previous system state data, new batch data in a next system state, and a causal graph to system state-invariant embeddings and system state-dependent embeddings;

generating a learned causal graph, via a graph generation layer, by integrating state-invariant and state-dependent information; and predicting, by a prediction layer, future time-series data on the learned causal graph.

2. The computer-implemented method of claim 1, wherein, when the learned causal graph and a root cause list converge, a root causes report for system recovery is generated.

3. The computer-implemented method of claim 1, wherein a state-invariant decoder is employed to learn invariant causal relations across two system states.

4. The computer-implemented method of claim 3, wherein a state-dependent decoder is employed to learn new causal relations introduced by the new batch data.

5. The computer-implemented method of claim 4, wherein the state-invariant decoder produces a state-invariant causal graph and the state-dependent decoder produces a state-dependent causal graph.

6. The computer-implemented method of claim 5, wherein the graph generation layer fuses the state-invariant causal graph with the state-dependent causal graph.

7. The computer-implemented method of claim 1, wherein the learned causal graph is input into a root cause analysis algorithm to output top pods as root causes of system failures.

8. A computer program product for identifying root cause failure and fault events, the computer program product comprising a non-transitory computer readable storage medium having program instructions embodied therewith, the program instructions executable by a computer to cause the computer to perform a method comprising:

detecting a trigger point;

converting, via an encoder, previous system state data, new batch data in a next system state, and a causal graph to system state-invariant embeddings and system state-dependent embeddings;

generating a learned causal graph, via a graph generation layer, by integrating state-invariant and state-dependent information; and predicting, by a prediction layer, future time-series data on the learned causal graph.

9. The computer program product of claim 8, wherein, when the learned causal graph and a root cause list converge, a root causes report for system recovery is generated.

10. The computer program product of claim 8, wherein a state-invariant decoder is employed to learn invariant causal relations across two system states.

11. The computer program product of claim 10, wherein a state-dependent decoder is employed to learn new causal relations introduced by the new batch data.

12. The computer program product of claim 11, wherein the state-invariant decoder produces a state-invariant causal graph and the state-dependent decoder produces a state-dependent causal graph.

13. The computer program product of claim 12, wherein the graph generation layer fuses the state-invariant causal graph with the state-dependent causal graph.

14. The computer program product of claim 8, wherein the learned causal graph is input into a root cause analysis algorithm to output top pods as root causes of system failures.

15. A computer processing system for identifying root cause failure and fault events, comprising:

a memory device for storing program code; and a processor device, operatively coupled to the memory device, for running the program code to:

detect a trigger point;

convert, via an encoder, previous system state data, new batch data in a next system state, and a causal graph to system state-invariant embeddings and system state-dependent embeddings;

generate a learned causal graph, via a graph generation layer, by integrating state-invariant and state-dependent information; and predict, by a prediction layer, future time-series data on the learned causal graph.

16. The computer processing system of claim 15, wherein, when the learned causal graph and a root cause list converge, a root causes report for system recovery is generated.

17. The computer processing system of claim 15, wherein a state-invariant decoder is employed to learn invariant causal relations across two system states.

18. The computer processing system of claim 17, wherein a state-dependent decoder is employed to learn new causal relations introduced by the new batch data.

19. The computer processing system of claim 18, wherein the state-invariant decoder produces a state-invariant causal graph and the state-dependent decoder produces a state-dependent causal graph.

20. The computer processing system of claim 19, wherein the graph generation layer fuses the state-invariant causal graph with the state-dependent causal graph.

\* \* \* \* \*